United States Patent
Zhou et al.

(10) Patent No.: US 7,914,157 B2
(45) Date of Patent: Mar. 29, 2011

(54) PROJECTOR WITH A LENS BARRIER MODULE

(75) Inventors: Jian-Chu Zhou, Foshan (CN); Jian-Wei Wu, Foshan (CN)

(73) Assignees: Premier Image Technology(China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 609 days.

(21) Appl. No.: 11/942,184

(22) Filed: Nov. 19, 2007

(65) Prior Publication Data
US 2009/0034045 A1    Feb. 5, 2009

(30) Foreign Application Priority Data
Aug. 1, 2007    (CN) .......................... 2007 1 0201242

(51) Int. Cl.
*G03B 21/14*    (2006.01)
*B60R 1/06*    (2006.01)
*H02B 5/00*    (2006.01)

(52) U.S. Cl. ......... 353/119; 359/507; 359/511; 361/616

(58) Field of Classification Search ................. 359/507, 359/511; 396/448; 361/616; 353/119, 122
See application file for complete search history.

(56) References Cited

U.S. PATENT DOCUMENTS
| 6,778,338 | B2 * | 8/2004 | Liu et al. | ....................... 359/808 |
| 2006/0268232 | A1 | 11/2006 | Jin | |
| 2007/0274029 | A1 * | 11/2007 | Lee et al. | ....................... 361/679 |

FOREIGN PATENT DOCUMENTS
| CN | 2677968 | Y | | 2/2005 |
| CN | 1821862 | A | | 8/2006 |
| JP | 11-64971 | A | | 3/1999 |
| JP | 2000-29094 | A | | 1/2000 |
| JP | 2000029094 | A | * | 1/2000 |

* cited by examiner

*Primary Examiner* — Georgia Y Epps
*Assistant Examiner* — Danell L Owens
(74) *Attorney, Agent, or Firm* — Jeffrey T. Knapp

(57) ABSTRACT

An exemplary projector includes a main body, a lens at a front of the main body and a lens barrier module positioned at the front of the main body for covering the lens when the projector is not in use or exposing the lens when the projector is in use. The lens barrier module includes a front bezel defining an opening aligned with the lens, a lens frame secured to a rear side of the front bezel and separated from the front bezel, and a lens cover slidably received between the front bezel and the lens frame. The lens frame defines an aperture aligned with the opening. The lens cover is positioned in a manner to selectively cover or uncover the lens.

8 Claims, 9 Drawing Sheets

PROJECTOR WITH A LENS BARRIER MODULE

BACKGROUND

1. Technical Field

The present invention relates to projectors and, particularly, to a projector with a lens barrier module.

2. Description of Related Art

Lenses are crucial in projectors. A lens protection mechanism such as a lens cap/cover is provided for a projector, for protecting the lens from being contaminated by dust or particles etc when not in use. When the projector is used, the lens cover is removed and set aside to uncover the lens. This creates a risk of losing the lens cover.

To prevent loss of the lens cover, it may be tethered to the projector front bezel, which is unsightly and inconvenient.

What is needed, therefore, is a projector with a lens barrier module, wherein the projector is compact and the lens of the projector can be covered and exposed conveniently.

SUMMARY

In accordance with a present embodiment, a projector includes a main body, a lens at a front of the main body and a lens barrier module positioned at the front of the main body for covering the lens when the projector is not in use or exposing the lens when the projector is in use. The lens barrier module includes a front bezel defining an opening aligned with the lens, a lens frame secured to a rear side of the front bezel and separated from the front bezel, and a lens cover slidably received between the front bezel and the lens frame. The lens frame defines an aperture aligned with the opening. The lens cover is positioned in a manner to selectively cover or uncover the lens.

Other advantages and novel features will be drawn from the following detailed description of at least one preferred embodiment, when considered in conjunction with the attached drawings.

BRIEF DESCRIPTION OF THE DRAWINGS

Many aspects of the present projector with a lens barrier module can be better understood with reference to the following drawings. The components in the drawings are not necessarily drawn to scale, the emphasis instead being placed upon clearly illustrating the principles of the present camera module. Moreover, in the drawings, like reference numerals designate corresponding parts throughout the several views.

DETAILED DESCRIPTION OF THE PREFERRED EMBODIMENTS

Embodiments of the present projector with a lens barrier module will now be described in detail below and with reference to the drawings.

Figure 6:
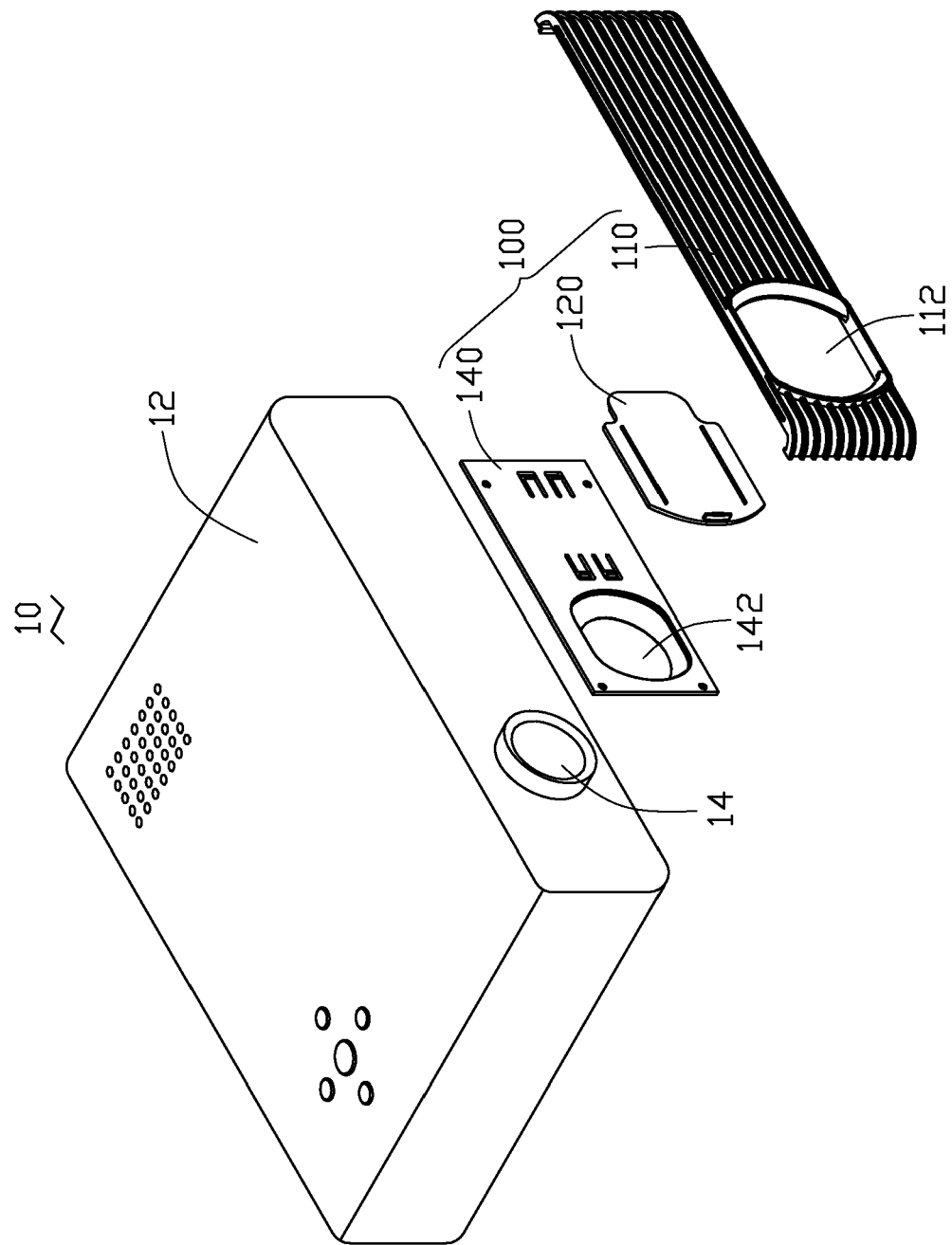
FIG. 6 is an exploded, isometric view of a projector with the lens barrier module of FIG. 1.

FIGS. 1-5 illustrate a lens barrier module 100, according to a first present embodiment. FIG. 6 illustrates a projector 10 using the lens barrier module 100. The projector 10 comprises a main body 12 and a lens 14 disposed at a front of the main body 12. The lens barrier module 100 is positioned at the front of the main body 12, for covering the lens 14 when the projector is not in use or exposing the lens 14 when the projector 10 is in use.

The lens barrier module 100 comprises a front bezel 110, a lens cover 120, and a lens frame 140. The front bezel 110 is positioned at a front side of the projector 10. The lens frame 140 is secured to a rear side of the front bezel 110 with a receiving space defined therebetween. The lens cover 120 is slidably received between the front bezel 110 and the lens frame 140 in the receiving space, and can be selectively positioned to cover the lens 14 or expose the lens 14.

Figure 1:
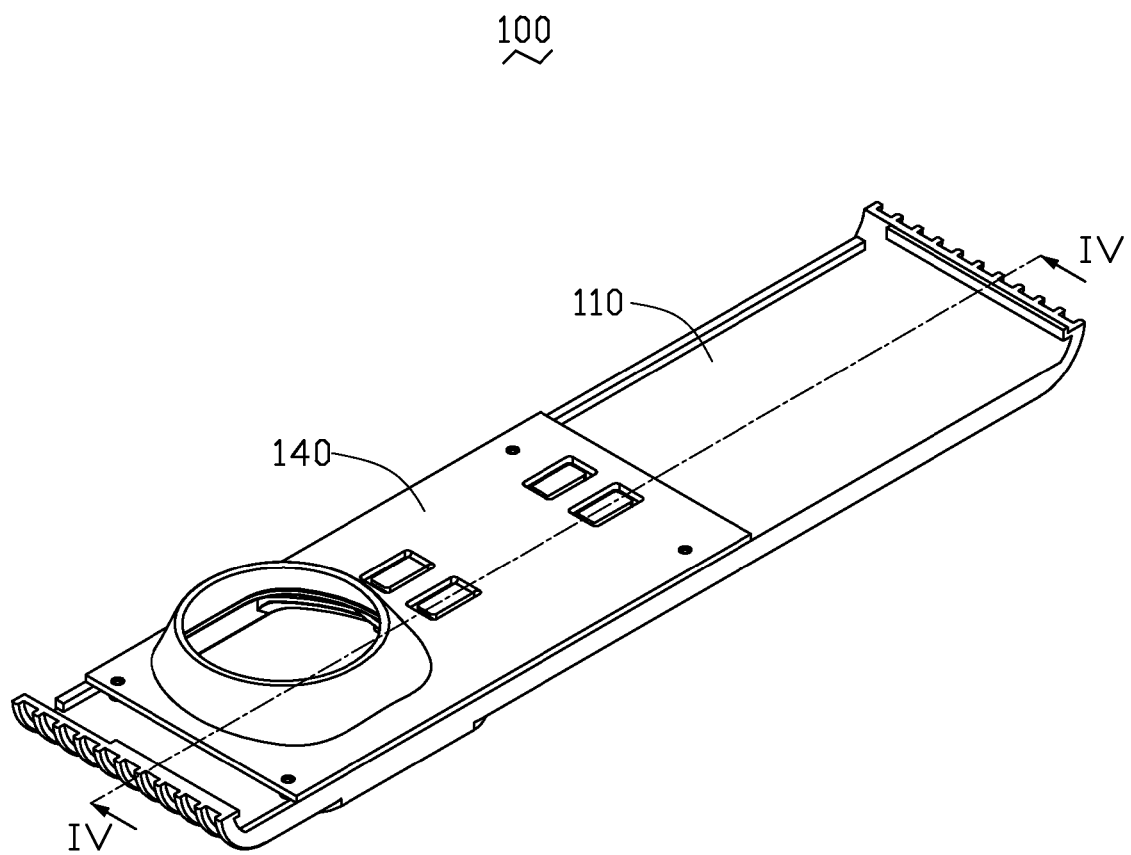
FIG. 1 is an isometric view of a lens barrier module, according to a first present embodiment.
Figure 2:
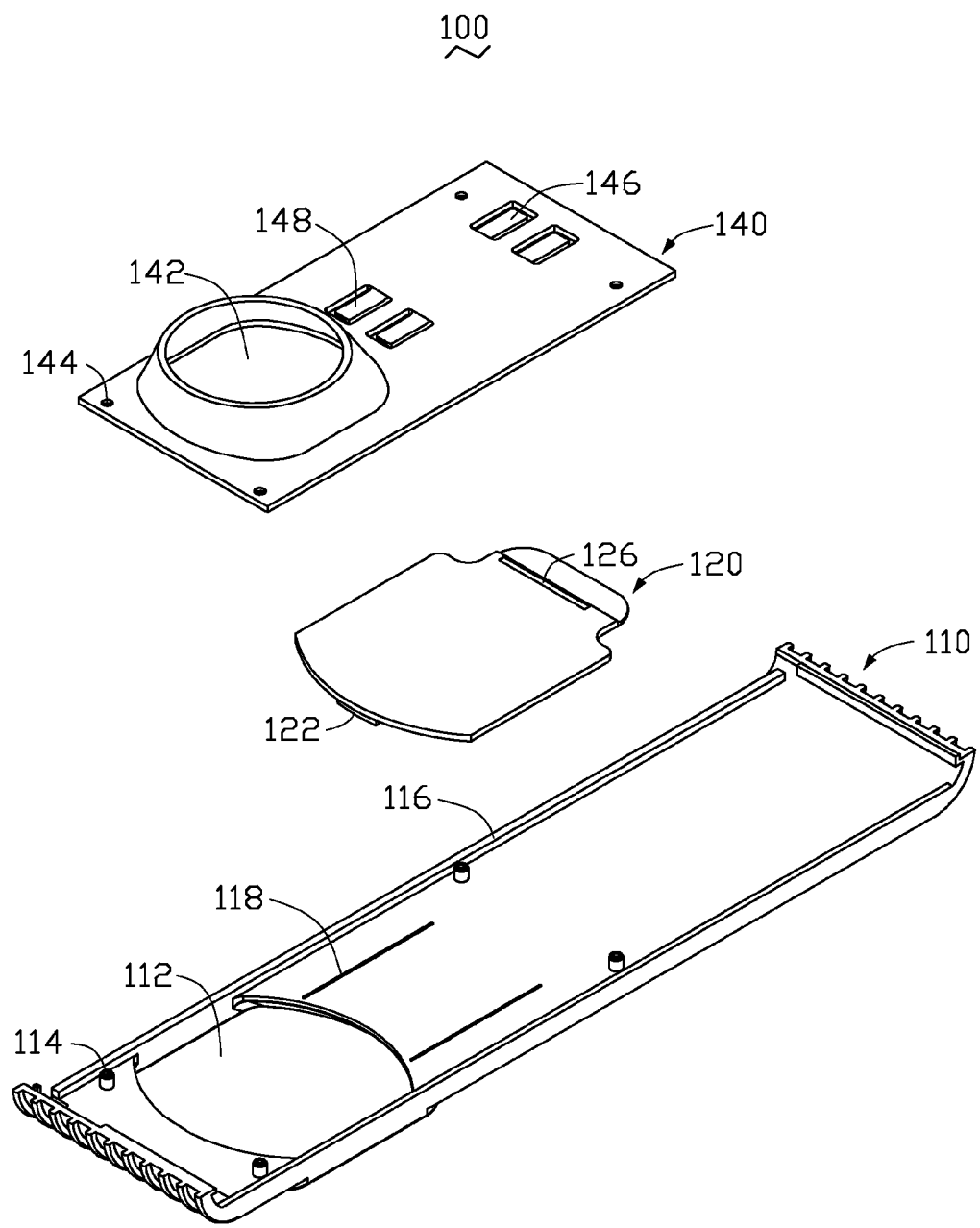
FIG. 2 is an exploded, isometric view of FIG. 1.

Referring to FIG. 2, the front bezel 110 defines an opening 112 therein, coaxially aligned with the lens 14. Four posts 114 with inner threads extend from the rear side of the front bezel 110. Two ribs 116 are formed on the rear side of the front bezel 110, near opposite main edges of the front bezel 110, for separating the lens frame 140 from the front bezel 110. Two separate parallel rails 118 are formed at the rear side of the front bezel 110, parallel to the ribs 116.

Figure 3:
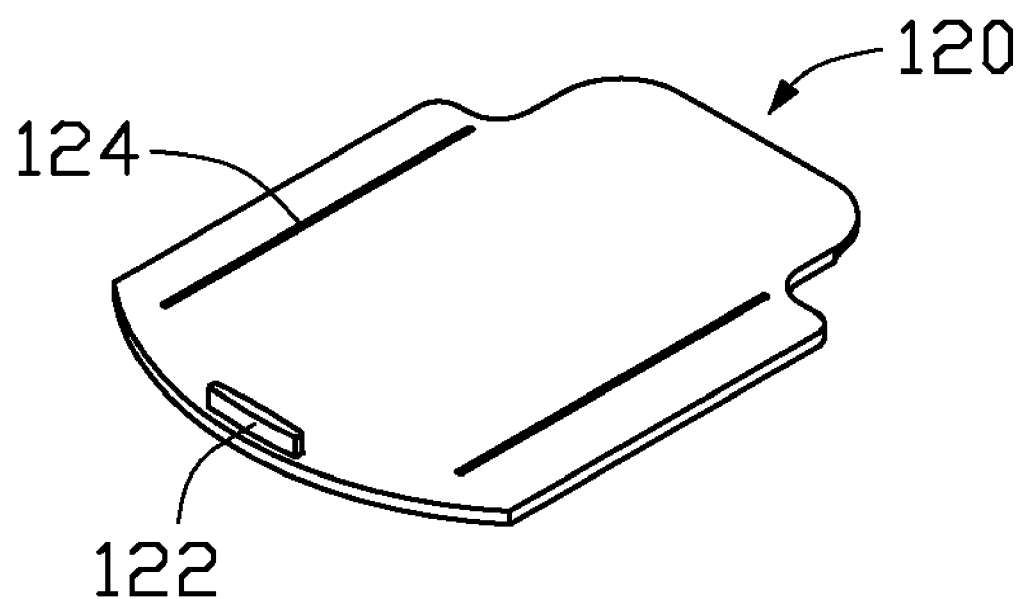
FIG. 3 is an isometric view of a lens cover of FIG. 2, but viewed from a different angle.

Referring to FIGS. 2-3, the lens cover 120 forms an operating tab 122 at a side thereof and defines a locking groove 126 at an opposite side thereof. The operating tab 122 and the locking groove 126 are remote from each other. The operating tab 122 extends from the lens cover 120 into the opening 112 of the front bezel 110, for facilitating manual operation of the lens cover 120. Two parallel slits 124 are defined in the lens cover 120. The rails 118 of the front bezel 110 are slidably received in the slits 124 of the lens cover 120, for allowing the lens cover 120 to slide relative to the front bezel 110. The operating tab 122 is restrained by a peripheral extremity of the opening 112 of the front bezel 110 in a direction parallel to the rails 118, so as to restrain travel of the lens cover 120 relative to the front bezel 110 (see FIG. 4).

Figure 4:
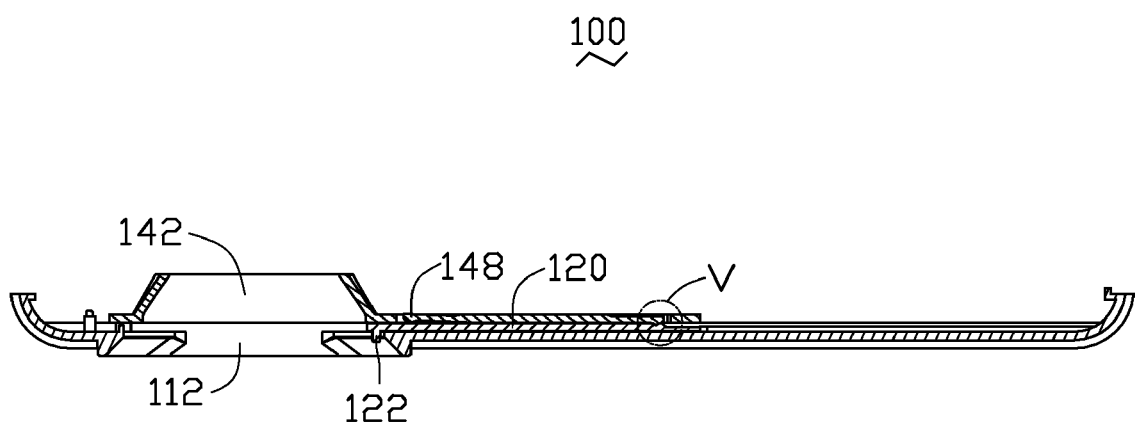
FIG. 4 is a cross-sectional view of FIG. 1, taken along IV-IV line.
Figure 5:
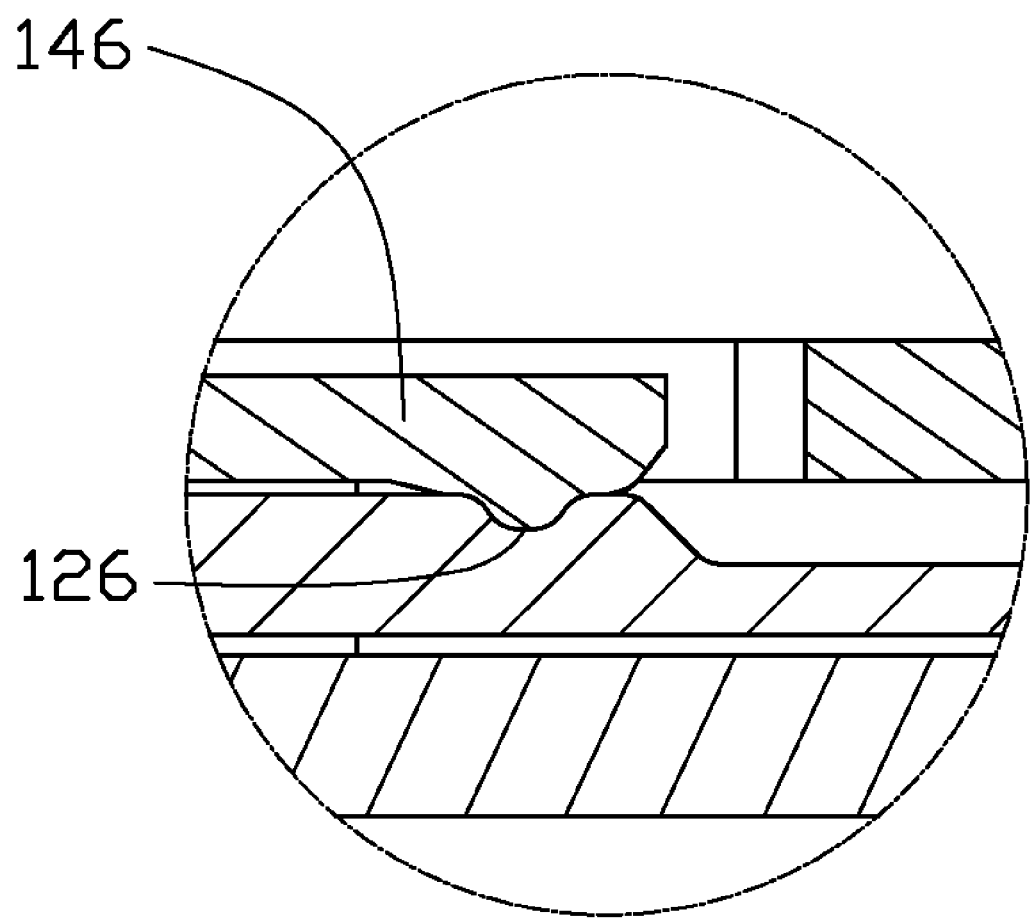
FIG. 5 is an enlarged view of the portion in circle V of FIG. 4.

Referring to FIGS. 2-5, the lens frame 140 defines an aperture 142 therein, coaxially aligned with the lens 140. The aperture 142 is slightly smaller than the opening 112. Four holes 144 are defined in the lens frame 140, corresponding to the posts 114 of the front bezel 110. The lens frame 140 is screwed to the front bezel 110 via screws (not shown) extending through the holes 144 and engaging with the inner threads of the posts 114, in the embodiment. Alternatively, glue or hook and slot joints are suitable for securing the lens frame 140 to the front bezel 110. The lens frame 140 further forms first and second elastic locking fingers 146, 148 protrude toward the lens cover 120. The first elastic locking fingers 146 are disposed side by side, the second elastic locking fingers 148 are also disposed side by side. The first elastic locking fingers 146 and the elastic second locking fingers 148 are separated and oriented toward opposite directions. In detail, the first elastic locking fingers 146 extend from the lens frame 140 away from the aperture 142, but the second elastic locking fingers 148 extend from the lens frame 140 toward the aperture 142. The first and second elastic locking fingers 146, 148 alternately engage in the locking groove 126 of the lens cover 120. When the first elastic locking fingers 146 engage in the locking groove 126 as shown in FIG. 4, the lens 14 is exposed. When the second elastic locking fingers 148 engage in the locking groove 126, the lens 14 is covered by the lens cover 120. The elastic locking fingers 146, 148 are elastically pressed backward by the lens cover 120 until the elastic locking fingers 146, 148, are slid into and engage with the locking grooves 126.

Figure 7:
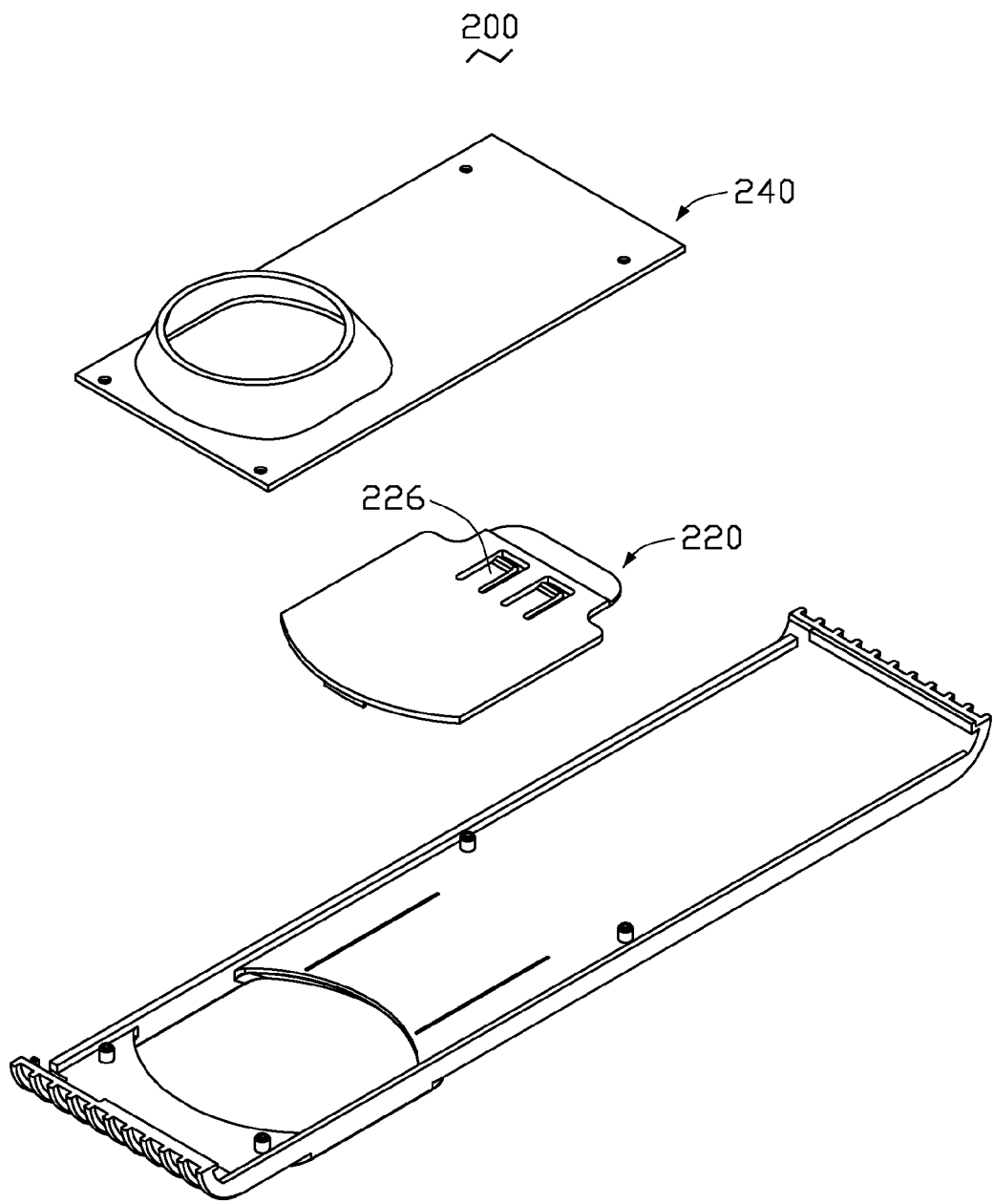
FIG. 7 is an exploded, isometric view of a lens barrier module, according to a second present embodiment.
Figure 8:
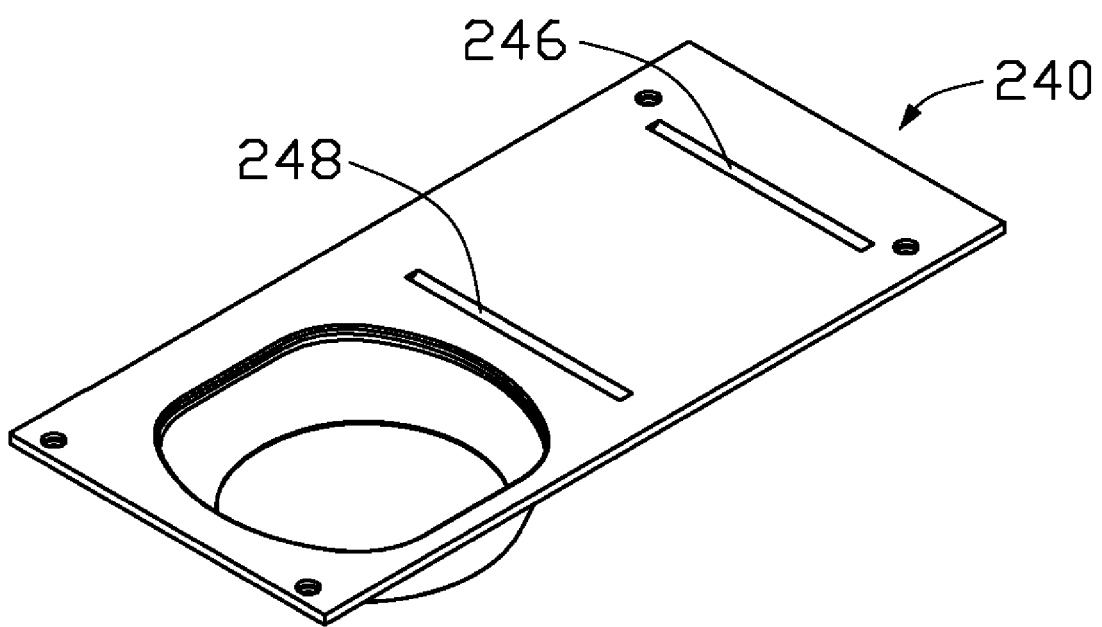
FIG. 8 is an isometric view of a lens cover of FIG. 6, but viewed from a different angle.

FIGS. 7-8 illustrate an alternative lens barrier module 200. The lens barrier module 200 is similar to the lens barrier module 100. However, the lens cover 220 forms two side-by-side locking fingers 226 thereon. The lens frame 240 defines first and second locking grooves 246, 248 therein. The locking fingers 226 selectively engage in the first and second locking grooves 246, 248. When the locking fingers 226 engage in the first locking groove 226, the lens 14 is exposed. When the locking fingers 226 engage in the second locking groove 248, the lens 14 is covered by the lens cover 220.

Figure 9:
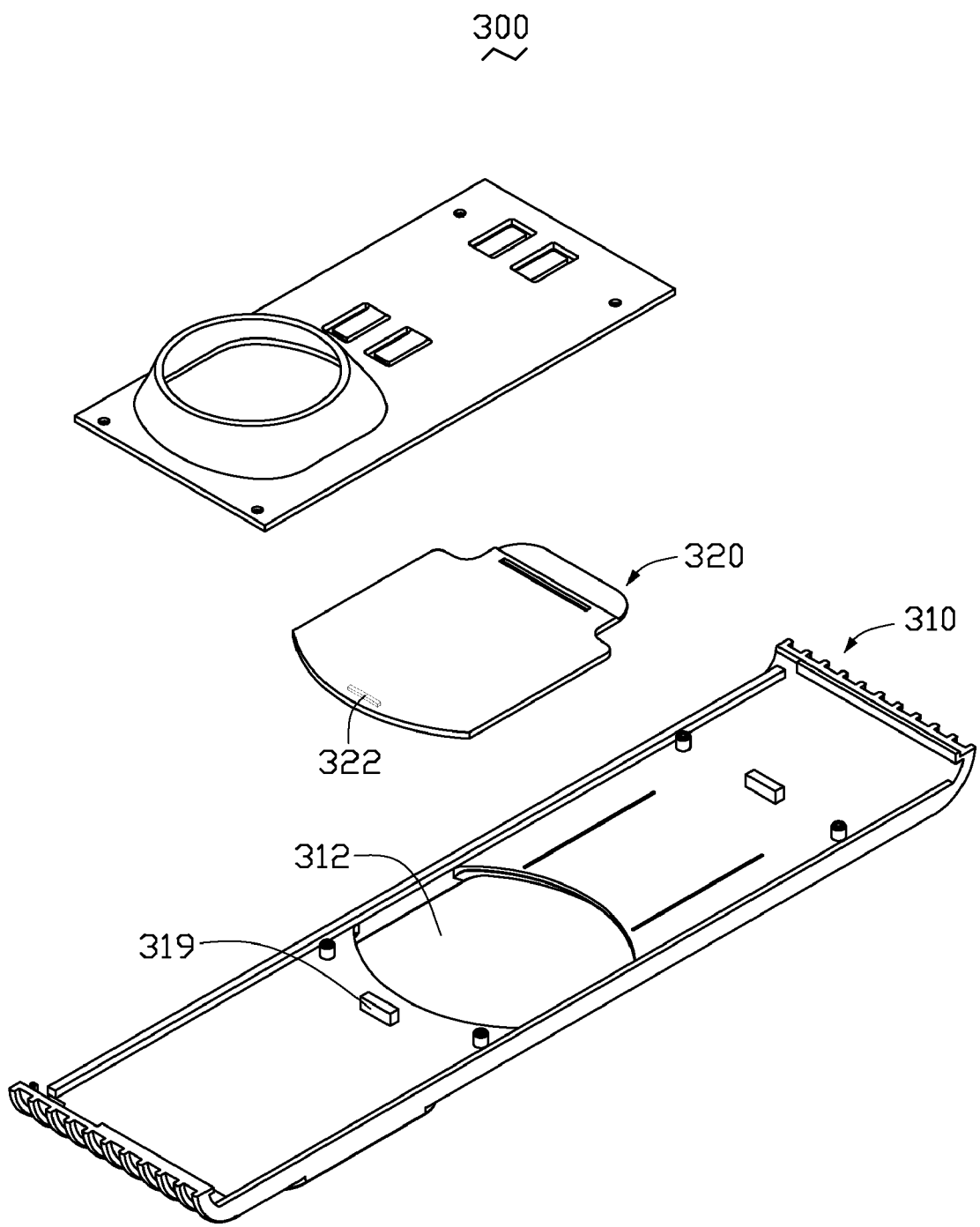
FIG. 9 is an exploded, isometric view of a lens barrier module, according to a third present embodiment.

FIG. 9 illustrates a further alternative lens barrier module 300. The lens barrier module 300 is similar to the lens barrier module 100. However, the lens cover 320 defines an operating groove 322 therein, for facilitating manual operation of the lens cover 320. The front bezel 310 forms two blocks 319 at the rear side thereof. The blocks 319 are disposed at opposite sides of the opening 312, and define a barrier to movement of the lens cover 320 in a direction parallel to the rails 318 of the front bezel 310 to restrain travel of the lens cover 320 relative to the front bezel 310.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A projector comprising:
    a main body;
    a lens at a front of the main body; and
    a lens barrier module positioned at the front of the main body for covering the lens when the projector is not in use or exposing the lens when the projector is in use, the lens barrier module comprising:
    a front bezel defining an opening aligned with the lens, the front bezel forming two blocks at a rear side thereof;
    a lens frame secured to the rear side of the front bezel and separated from the front bezel, the lens frame defining an aperture aligned with the opening, the lens frame forming first and second elastic locking fingers thereon separated from each other; and
    a lens cover slidably received between the front bezel and the lens frame and positioned in a manner to selectively cover or uncover the lens, the lens cover defining an operating groove in a side thereof, for facilitating manual operation of the lens cover, wherein the blocks of the front bezel are disposed at opposite sides of the opening and define a barrier to restrain travel of the lens cover relative to the front bezel; the lens cover defines a locking groove therein, the first and second locking fingers alternately engaging in the locking groove; the elastic locking fingers protrude toward the lens cover and are elastically pressed backward by the lens cover until the elastic locking fingers are slid into and engage with the locking grooves.

2. The projector as claimed in claim 1, wherein the lens frame is screwed to the front bezel.

3. The projector as claimed in claim 1, wherein the front bezel forms two ribs on the rear side thereof, for separating the lens frame from the front bezel.

4. The projector as claimed in claim 1, wherein two parallel rails are formed at the rear side of the front bezel and two slits are defined in the lens cover, and wherein the rails are slidably received in the slits for allowing the lens cover to slide relative to the front bezel.

5. The projector as claimed in claim 1, wherein the aperture is slightly smaller than the opening.

6. The projector as claimed in claim 1, wherein the lens cover defines a locking groove therein at an opposite side thereof and remote from the operating groove, for selectively engaging with different portions of the lens frame.

7. The projector as claimed in claim 1, wherein the first and second locking fingers are oriented toward opposite directions.

8. The projector as claimed in claim 1, wherein the lens frame defines first and second locking grooves therein separated from each other, and wherein the lens cover forms two locking fingers thereon, the locking fingers selectively engaging in the first or second locking grooves.

* * * * *